March 20, 1956     J. M. STYER     2,738,613
AERATING DEVICE
Filed July 9, 1952
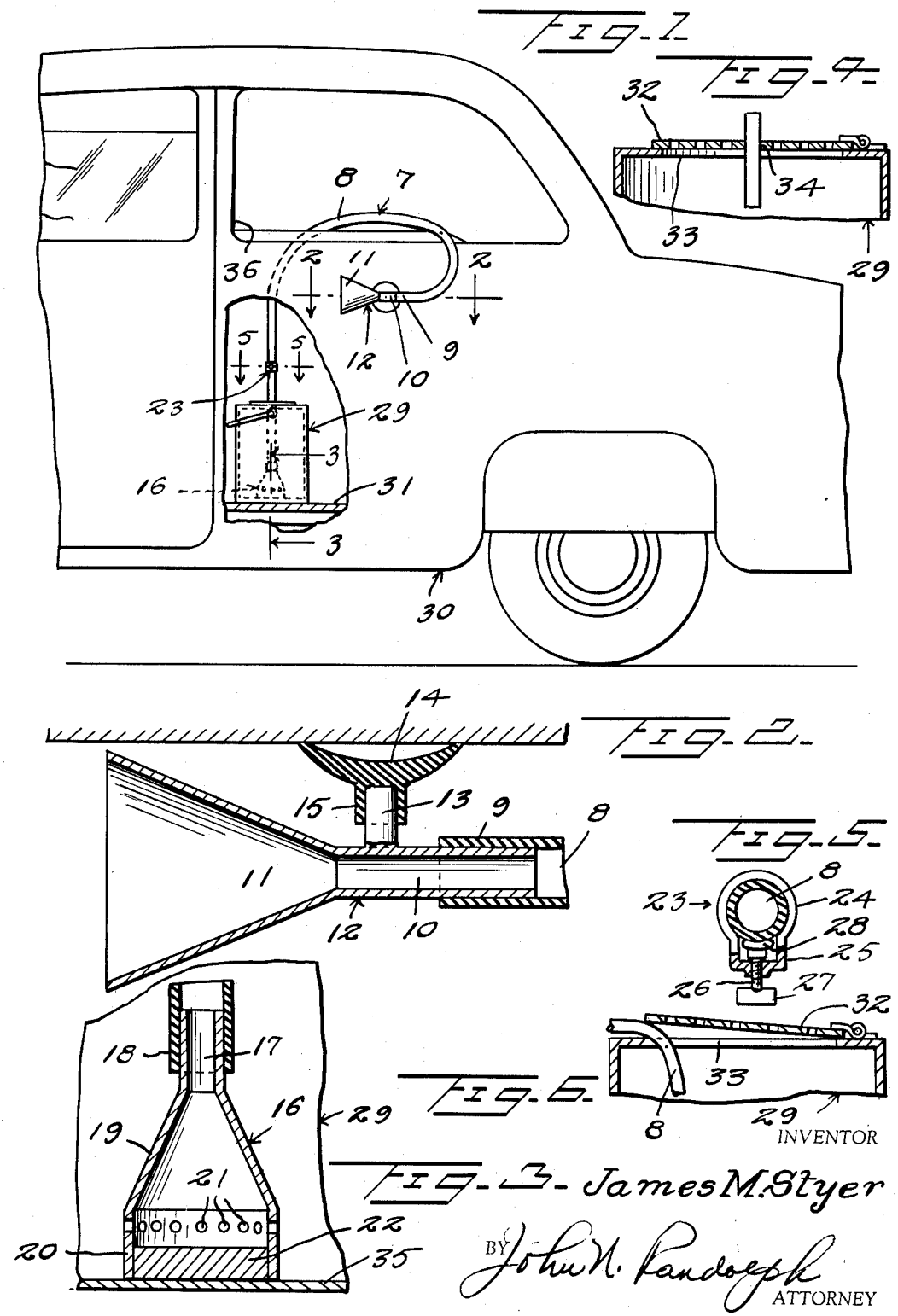
INVENTOR
James M. Styer
BY John M. Randolph
ATTORNEY

2,738,613

AERATING DEVICE

James M. Styer, Newcomerstown, Ohio

Application July 9, 1952, Serial No. 297,922

1 Claim. (Cl. 43—56)

This invention relates to a novel aerating device of extremely simple construction adapted to be used on conveyances in which a container containing live bait or other aquatic animals is being transported for aerating the water within the container to maintain the aquatic animals alive for an indefinite period.

While the present invention is primarily adapted for use in conjunction with a minnow bucket or similar live bait container for fishing bait and is adapted to be detachably mounted on a motor vehicle in which the bait is transported, it will be readily apparent that the aerating device may be equally well used for containers of other types of aquatic water breathing animals transported in other forms of conveyances such as trucks and may likewise be used for aerating live fishing bait while being transported in a boat.

Still a further particularly important object of the present invention is to provide an aerating device of extremely simple construction which may be very economically manufactured and sold and which may be utilized with substantially any form of container for aquatic animals without modification thereof and without requiring means for supporting the container in a particular position of the conveyance.

Still another object of the invention is to provide an aerating device having a novel air discharge unit or nozzle which is so constructed that it will be effectively maintained adjacent the bottom of a container the liquid contents of which is to be aerated and which is so constructed that the discharge of air therefrom may not be obstructed or impeded.

Various other objects and advantages of the invention will hereinafter become more fully apparent from the following description of the drawing, illustrating a presently preferred embodiment thereof, and wherein:

Figure 1 is a side elevational view, partly broken away, showing the aerating device in one preferred application;

Figure 2 is an enlarged fragmentary sectional view taken substantially along a plane as indicated by the line 2—2 of Figure 1;

Figure 3 is an enlarged fragmentary vertical sectional view taken substantially along a plane as indicated by the line 3—3 of Figure 1;

Figure 4 is a fragmentary vertical sectional view of the upper portion of a container for aquatic animals showing a portion of the aerating device associated therewith;

Figure 5 is an enlarged cross sectional view taken substantially along a plane as indicated by the line 5—5 of Figure 1, and Figure 6 is a view similar to Figure 4 of another application of the aerating device to a container.

Referring more specifically to the drawing, the aerating device in its entirety is designated generally 7 and includes a flexible conduit or hose 8 which may be of any desired length and which is formed of a material which is impervious to air or substantially so, such as rubber. One end 9 of the conduit or hose 8 is detachably connected as by an overlapping press fit engagement to a distal end of a rigid tubular member 10 the opposite end of which merges integrally with the restricted end of a flared funnel shaped inlet mouth 11, the tube portion 10 and inlet mouth 11 constituting the inlet, designated generally 12, of the aerator 7. The tube 10, adjacent the flared inlet mouth 11, has a stem or stud 13 fixed thereto and projecting radially therefrom. A conventional rubber suction cup 14 has a socket 15 projecting from its convex side in which the stud 13 is suitably secured.

The aerating device 7 includes a novel discharge nozzle, designated generally 16 and best illustrated in Figure 3, which is provided with a restricted tubular upper portion 17 which is detachably secured as by a press fit connection in overlapping relationship to the opposite end 18 of the flexible conduit or hose 8. The nozzle 16 includes a frusto-conical intermediate portion 19 which flares from the lower end of the tubular portion 17 and the large end of which merges integrally with a cylindrical lower end portion 20 having a series of circumferentially spaced discharge ports or apertures 21 formed therein. The lower outer part of the cylindrical portion 20 is closed by a relatively thick flat element 22 of considerable weight which is seated therein and seals the lower end of the nozzle 16 and which is disposed outwardly of or beneath the apertures 21. While the nozzle 16 has been illustrated and described as being of circular cross section, it will be readily apparent that the portions 19 and 20 thereof might be of any other cross sectional shape.

A valve unit 23 is adjustably mounted on the flexible conduit or hose 8 at any convenient distance from the ends thereof and as illustrated in Figure 5, includes a relatively wide ring or band 24 which surrounds a portion of the conduit 8 and which has an outwardly offset portion 25 through the outer part of which a screw 26 is threaded. The screw 26 is provided at its outer end with a flat head 27 adapted to be manually grasped for turning the screw to advance it inwardly of or retracted outwardly from the ring 24. A movable clamping element 28 is swively mounted on the inner end of the screw 26 and has a relatively wide inner end which bears against a portion of the conduit 8 so that when the screw 26 is turned in one direction the clamp element 28 will be displaced inwardly to compress a portion of the conduit 8 between said clamp element 28 and a portion of the ring 24 which is disposed opposite to the clamp element 28, to thereby restrict the bore of said conduit portion to restrict or control the amount of air passing therethrough toward the nozzle 16.

One preferred application and use of the aerating device 7 has been disclosed in Figure 1 wherein a conventional "minnow bucket" or similar live bait container 29 is shown disposed in an automobile 30 and resting on the floor 31 thereof. The minnow bucket 29 is provided with the usual apertured hinged cover 32 closing the opening 33 in the top thereof. One of the openings or apertures of the cover 32 is enlarged sufficiently as indicated at 34 so that the conduit end 18 when disengaged from the nozzle 16 may be inserted inwardly through the opening 34. The nozzle 16 is then re-applied to the conduit end 18 and the conduit 8 is displaced inwardly through the cover 32 sufficiently so that the weighted bottom 22 of the nozzle 16 may rest upon the bottom 35 of the container 29. The hose or conduit 8 is then extended outwardly through an open window 36 of the vehicle 30 and the suction cup 14 is secured in a conventional manner to a portion of the outer side of the vehicle 30 by being pressed thereagainst to support the conduit end 9 and the inlet 12 in a position longitudinally of the vehicle 30 and so that the flared inlet end or mouth 11 of the member 12 will open forwardly of the vehicle. It will thus be readily apparent that when the vehicle 30 is moving forwardly air will enter through the flared inlet portion 11 and will be compelled under pressure through the conduit 8 into the discharge nozzle 16 from which the air is ejected under pressure radially in all directions from the discharge apertures 21. It will also be apparent that the weighted nozzle 16 will be maintained by its weight in an upright position as illustrated in Figure 3 and in engagement with the container bottom 35 so that the air ejected from the nozzle 16 into the water or liquid, not shown, contained in the container 29, will enter the liquid substantially below the surface thereof and in substantially all directions for uniformly aerating the water or liquid. It will also be readily apparent that the ejection of the air from the nozzle 16 cannot be substantially impeded or obstructed since the air is ejected therefrom in all directions therearound.

If preferred, the hose or conduit 8 as illustrated in Figure 6 may be inserted into the container 29 through its opening 33 and beneath a portion of the closure 32 which may be left partially open and the weight of the nozzle 16 will effectively function to maintain said nozzle at the bottom of the container 29, as illustrated in Figure 3, when the hose or conduit is disposed as seen in Figure 6. It will likewise be apparent that the aerating device 7 may be used with any other type of container containing water or other liquid and water breathing aquatic animals, such as ordinary buckets or pails, aquariums or the like, and the weighted nozzle 16 will be effectively maintained by its weight in the bottom of the container and well beneath the water level thereof. The valve means 23 is preferably positioned above the container in which the nozzle 16 is disposed and in a convenient position so that the screw 26 can be manually adjusted to effectively regulate the amount of air discharged into the water contents of the container.

It will likewise be readily apparent that the container 29 could be disposed in the trunk of the vehicle 30 and the conduit 8 could extend into the trunk with the lid thereof left ajar to function in the same manner as previously described. It will also be apparent that the aerating device 7 may be utilized in the same manner in the transportation of live bait on a boat by attaching the suction cup 14 to the outer side of the hull or deck of the boat to thus aerate water containing minnows or other live bait while moving to or from a fishing location.

Various other modifications and changes are contemplated and may obviously be resorted to, without departing from the spirit or scope of the invention as hereinafter defined by the appended claim.

I claim as my invention:

An aerating device for a liquid container comprising an elongated flexible conduit having a flared inlet end, means adapted to support said inlet end of the conduit in a forwardly facing position on the exterior of a motor vehicle, said conduit having at the opposite end thereof a flared discharge nozzle portion adapted to be disposed in a receptacle containing a liquid, said nozzle portion being provided with a substantially flat underside and a flat element of considerable weight seated in a lower part of the nozzle portion and sealing the lower end thereof, said nozzle portion including a hollow part disposed directly above said flat element and provided with spaced discharge apertures located adjacent said flat element, such that as the device is carried forward by the vehicle air will be blown through the inlet end thereof and will be forced outwardly through the nozzle apertures into the liquid of the receptacle, the weighted means maintaining the nozzle portion at all times on the bottom of the receptacle.

References Cited in the file of this patent
UNITED STATES PATENTS

| | | |
|---|---|---|
| 1,932,625 | Hopple | Oct. 31, 1933 |
| 1,991,149 | Haislip | Feb. 12, 1935 |
| 1,995,215 | Mehlsen et al. | Mar. 19, 1935 |
| 2,008,363 | Maris | July 16, 1935 |
| 2,230,201 | Hermann | Jan. 28, 1941 |
| 2,460,527 | Oliveros | Feb. 1, 1949 |
| 2,483,561 | Rauh | Oct. 4, 1949 |
| 2,510,427 | Soucie | June 6, 1950 |